US012806753B2

(12) United States Patent
Charoenphan et al.

(10) Patent No.: US 12,806,753 B2
(45) Date of Patent: Nov. 24, 2026

(54) IMPACT TOOL WITH TAPERED ANVIL WING DESIGN

(71) Applicant: Snap-on Incorporated, Kenosha, WI (US)

(72) Inventors: Saiphon C. Charoenphan, Kenosha, WI (US); Adrian J. Robillard, Kenosha, WI (US); John E. Fuhreck, Kenosha, WI (US); Collin T. Kohls, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 19/042,153

(22) Filed: Jan. 31, 2025

(65) Prior Publication Data

US 2025/0170695 A1 May 29, 2025

Related U.S. Application Data

(63) Continuation of application No. 17/841,221, filed on Jun. 15, 2022, now Pat. No. 12,257,685.

(60) Provisional application No. 63/220,325, filed on Jul. 9, 2021.

(51) Int. Cl.
*B25B 21/02* (2006.01)
*B25D 17/06* (2006.01)

(52) U.S. Cl.
CPC .............. *B25D 17/06* (2013.01); *B25B 21/02* (2013.01); *B25D 2217/0015* (2013.01)

(58) Field of Classification Search
CPC ...................................................... B25B 21/02
USPC .................................................. 173/93.6, 93
See application file for complete search history.

(56) References Cited

U.S. PATENT DOCUMENTS

| | | | | |
|---|---|---|---|---|
| 2,061,843 | A | 11/1936 | Meunier | |
| 2,158,303 | A | 5/1939 | Pott | |
| 2,219,865 | A | 10/1940 | Fitch | |
| 2,268,412 | A | 12/1941 | McCombs | |
| 2,339,531 | A | 1/1944 | Sittert | |
| 2,439,823 | A * | 4/1948 | Porter | B25B 21/026 173/93.5 |
| 2,533,703 | A | 12/1950 | Wilhide | |

(Continued)

FOREIGN PATENT DOCUMENTS

| | | | |
|---|---|---|---|
| CN | 203738751 | U | 7/2014 |
| CN | 104972435 | A | 10/2015 |

(Continued)

OTHER PUBLICATIONS

Chinese Patent Office, Second Office Action issued in corresponding Application No. 202210788252.X, dated May 31, 2025, 7 pp.

(Continued)

*Primary Examiner* — Praachi M Pathak
(74) *Attorney, Agent, or Firm* — Taft, Stettinius & Hollister LLP

(57) ABSTRACT

An anvil for an impact mechanism, where the anvil includes wings that taper at a taper angle of about 5 degrees to about 30 degrees. The anvil may also include a shaft extending from the wings, and a drive end adapted to transfer and apply torque to a work piece. The wings of the anvil also include wing impact surfaces that receive rotational impact forces from a hammer. For example, the hammer contacts and applies torque to the wings of the anvil.

12 Claims, 9 Drawing Sheets

(56) References Cited

U.S. PATENT DOCUMENTS

| | | | | |
|---|---|---|---|---|
| 2,539,678 | A | 1/1951 | Thomas | |
| 2,583,147 | A | 1/1952 | Kaplan | |
| 2,691,434 | A | 10/1954 | Jimeron | |
| 2,711,662 | A * | 6/1955 | Shaff | B25B 21/026 173/93.5 |
| 2,720,956 | A | 10/1955 | Coombes | |
| 2,733,621 | A | 2/1956 | Newman | |
| 2,756,853 | A | 7/1956 | Madsen | |
| 2,797,782 | A | 7/1957 | Connell | |
| 3,009,552 | A | 11/1961 | Ondeck | |
| 3,068,973 | A | 12/1962 | Maurer | |
| 3,106,274 | A | 10/1963 | Madsen | |
| 3,203,283 | A | 8/1965 | Newman | |
| 3,208,569 | A | 9/1965 | Adee | |
| 3,269,466 | A | 8/1966 | Mitchell | |
| 3,526,282 | A | 9/1970 | Newman | |
| 5,199,505 | A | 4/1993 | Izumisawa | |
| 6,223,834 | B1 | 5/2001 | Takamura et al. | |
| 8,042,621 | B2 | 10/2011 | Barezzani et al. | |
| 2009/0014193 | A1 * | 1/2009 | Barezzani | B25B 21/026 173/93 |
| 2011/0048751 | A1 * | 3/2011 | Elger | B25B 21/026 173/93.5 |
| 2014/0338943 | A1 | 11/2014 | Bothmann | |
| 2017/0036327 | A1 * | 2/2017 | Murakami | B25F 5/006 |
| 2019/0247985 | A1 * | 8/2019 | Xu | B25B 21/026 |
| 2019/0255687 | A1 | 8/2019 | Schneider et al. | |
| 2021/0060741 | A1 * | 3/2021 | Kusumoto | B25B 21/026 |

FOREIGN PATENT DOCUMENTS

| | | | |
|---|---|---|---|
| CN | 210025095 | U | 2/2020 |
| CN | 112440237 | A | 3/2021 |
| CN | 212794847 | U | 3/2021 |
| DE | 102017122862 | A1 | 4/2019 |
| DE | 202020100365 | U1 | 2/2020 |
| GB | 1476441 | A | 6/1977 |
| GB | 2128916 | A | 5/1984 |
| JP | 2014151389 | A | 8/2014 |
| JP | 2018001314 | A | 1/2018 |
| JP | 2019195893 | A | 11/2019 |
| WO | 2015182512 | A1 | 12/2015 |
| WO | 2021241099 | A1 | 12/2021 |

OTHER PUBLICATIONS

Chinese Patent Office, First Office Action issued in corresponding Application No. 202210788252.X, dated Oct. 25, 2024, 11 pp.
UK Intellectual Property Office, Examination Report issued in corresponding Application No. GB2407904.8, dated Sep. 18, 2024, 7 pp.
Taiwan Office Action for corresponding TW Application No. 111125089, dated Jan. 23, 2024, 8 pp.
United Kingdom Combined Search and Examination Report for corresponding UK Application No. GB2319435.0, dated Feb. 12, 2024, 8 pp.
Australian Examination Report No. 1 for corresponding AU Application No. 2022204796, dated Aug. 2, 2023, 4 pp.
United Kingdom Examination Report for corresponding UK Application No. GB2209857.8, dated Aug. 16, 2023, 5 pp.
Canadian Office Action for corresponding CA Application No. 3,166,675, dated Sep. 14, 2023, 3 pp.
Combined Search and Examination Report for corresponding Application No. GB2209857.8, dated Dec. 20, 2022, 7 pp.
Australian Patent Office, Examination Report No. 1 issued in corresponding Application No. 2024202092, dated Apr. 4, 2025, 5 pp.
UK Intellectual Property Office, Combined Search and Examination Report issued in corresponding Application No. GB2500754.3, dated Feb. 5, 2025, 7 pp.

* cited by examiner

IMPACT TOOL WITH TAPERED ANVIL WING DESIGN

CROSS REFERENCES TO RELATED APPLICATIONS

This application is a continuation of, and claims the priority benefit of, U.S. patent application Ser. No. 17/841,221, filed Jun. 15, 2022, which claims the priority benefit of U.S. Provisional Patent Application Ser. No. 63/220,325, filed Jul. 9, 2021, the contents of which are incorporated herein by reference in their entirety.

TECHNICAL FIELD

The present invention relates generally to impact tools for driving fasteners, and more particularly to an anvil for an impact tool having a tapered anvil wing design.

BACKGROUND

A variety of wrenches and tools are commonly used to apply torque to a work piece, such as a threaded fastener. One such tool, known as an impact wrench, driver, drill or tool, is designed to deliver high torque output by storing energy in a rotating mass, then delivering it suddenly to the output shaft. In operation, a rotating mass, known as a hammer, is accelerated by a motor, storing energy, then suddenly connected to the output shaft, via an anvil, creating a high-torque impact. The hammer mechanism is designed such that after delivering the impact force, the hammer is allowed to spin freely, and does not stay locked. As such, the only reaction force applied to the body of the tool is the motor accelerating the hammer, and thus the operator feels very little torque, even though a very high peak torque is delivered. The traditional hammer design requires a certain minimum torque before the hammer is allowed to spin separately from the anvil, causing the tool to stop hammering and instead smoothly drive the fastener if only low torque is needed, rapidly rotating the fastener.

Traditional impact tools are designed to impact on mating surfaces of the hammer and anvil, assumed to be rotating on the same center axis. Assembly clearances and wear cause the surfaces to make contact on straight flats of the hammer and straight wings of the anvil at locations that may vary from tool to tool. With traditional designs, high stress is placed on the anvil where the anvil wing transitions into the shaft of the anvil. Accordingly, the internal components of an impact tool, such as the hammer, anvil, and shaft can be subjected to unwanted stresses that may reduce the efficiency and useful lifespan of the tool.

SUMMARY

The present invention relates broadly to an anvil for an impact mechanism, where the anvil includes wings that taper at a taper angle of about 5 degrees to about 30 degrees. The anvil may also include a shaft extending from the wings, and a drive end adapted to transfer and apply torque to a work piece. The wings of the anvil also include wing impact surfaces that receive rotational impact forces from a hammer. For example, the impact mechanism may also include a hammer that is rotatable about a central axis and has hammer impact surfaces or lugs. The hammer lugs contact and apply torque or rotational force to the wings of the anvil.

During operation, the wings of the anvil can experience high stresses at an intersection of the wings and the shaft of the anvil. At this intersection, a dominant bending stress at the wing transitions to torsional stress in the shaft. A section modulus of the anvil at the intersection of the wings and the shaft can be increased without increasing the entire cross-section of the wings by incorporating the taper angle of about 5 degrees to about 30 degrees, without sacrificing the hammer travel range. The taper angle also provides for a larger contact area between the lug of the hammer and wing of the anvil, decreasing contact pressure, and the decreasing stiffness of the wing along a length of the wing (due to the taper angle) improves stress distribution and stress at the lug of the hammer.

In an embodiment the invention relates broadly to an anvil for an impact mechanism of an impact tool. The anvil includes a base portion; a wing radially extending outwardly from the base portion, and tapered at an angle of about 5 degrees to about 30 degrees; and a shaft extending axially from the base portion.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
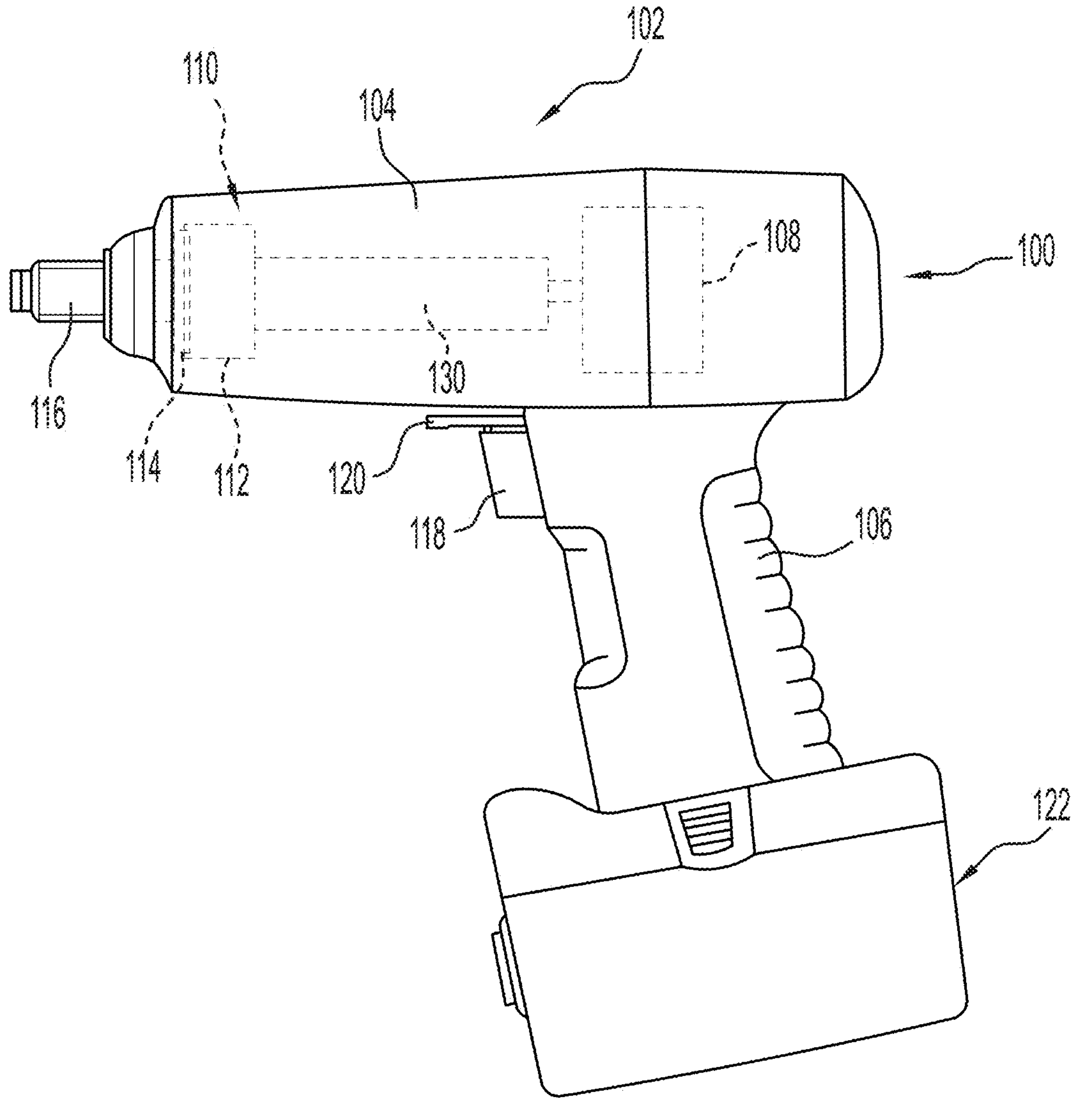
FIG. 1 is a side view of an impact tool, according to an embodiment of the invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to an anvil for an impact mechanism, where the anvil includes wings that taper at a taper angle of about 5 degrees to about 30 degrees. The anvil may also include a shaft extending from the wings, and a drive end adapted to transfer and apply torque to a work piece. The wings of the anvil also include wing impact surfaces that receive rotational impact forces from a hammer. For example, the impact mechanism may also include a hammer that is rotatable about a central axis and has hammer impact surfaces or lugs. The hammer lugs contact and apply torque or rotational force to the wings of the anvil.

During operation, the wings of the anvil can experience high stresses at an intersection of the wings and the shaft of the anvil. At this intersection, a dominant bending stress at the wing transitions to torsional stress in the shaft. A section modulus of the anvil at the intersection of the wings and the shaft can be increased without increasing the entire cross-section of the wings by incorporating the taper angle of about 5 degrees to about 30 degrees, without sacrificing the hammer travel range. The taper angle also provides a larger contact area between the lug of the hammer and wing of the anvil, thereby decreasing contact pressure, and the decreasing stiffness of the wing along a length of the wing (due to the taper angle) improves stress distribution and stress at the lug of the hammer.

Referring to FIG. 1, an exemplary impact tool 100 according to an embodiment of the invention is illustrated. The impact tool 100 may have a housing 102, including a main housing portion 104 and a handle portion 106. A motor 108 and an impact mechanism 110 may be disposed in the main housing portion 104. The impact mechanism 110 may include a hammer 112 and anvil 114, and the anvil 114 may include or be coupled to an output drive 116. The drive 116 is adapted to apply torque to a work piece, such as a fastener (e.g., a wheel lug nut or bolt), via an adapter, bit, or socket coupled to the drive 106. As illustrated, the drive 116 is a "male" connector (e.g., a drive lug, which may include a square or other polygonal cross-sectional shape) designed to fit into or matingly engage a female counterpart. However, the drive 116 may alternately include a "female" connector designed to matingly engage a male counterpart. The driver 116 may also be structured to directly engage a work piece without requiring coupling to an adapter, bit, or socket. The drive 116 is operatively coupled to and driven by the motor 108 (which may be a pneumatic motor, or brushed or brushless electric motor) via the impact mechanism 110.

A trigger 118 for controlling operation of the motor 108 may be operably coupled to the motor 108 and disposed in the housing 102. A selector lever 120 may also be operably coupled to the trigger 118 and/or motor 108 to allow for selection or a rotational drive direction (e.g. clockwise or counter-clockwise) to be controlled. The motor 108 can be operably coupled to a power source 122 (such as a battery or other power source), motor speed circuitry, and/or controller via the trigger 118 (housed in the housing 102) in a well-known manner, and operably coupled to the driver 116 to provide torque to the tool 100 and, in turn, to the drive 116 via the impact mechanism 110. The motor 108 may be a brushless or brushed type motor, pneumatic, or any other suitable motor.

The trigger 118 can be adapted to selectively cause power to the motor 108 to be turned ON and OFF, or cause electric power/voltage to flow from the power source 122 to the motor 108 or cease flow from the power source 122 to the motor 108. The trigger 118 can be biased towards the OFF position, such that the trigger 118 is actuated or depressed inwardly, relative to the housing 102, to move the trigger 118 to the ON position to cause the tool 100 to operate, and releasing the trigger 118 causes the trigger 118 to move to the OFF position, to cease operation of the tool 100 via the biased nature of the trigger 118. The trigger 118 may also be a variable speed trigger. In this regard, relative actuation of the trigger 118 causes the motor 108 to operate at variable increasing speeds the further the trigger 118 is actuated.

During operation, the motor 108 selectively rotates the hammer 112 in either of first and second rotational drive direction (e.g. clockwise or counter-clockwise), which rotates the anvil 114 and drive 116 to apply torque to the work piece. In high torque situations, the hammer 112 is disengaged from the anvil 114, and the motor 108 rotates the hammer 112 independent of the anvil 114. To apply a high torque output, the hammer 112 engages the anvil and delivers a high torque output to the anvil 114, creating a high-torque impact. The impact mechanism 110 is designed such that after delivering the impact force, the hammer 112 is disengaged from the anvil 114 and allowed to rotate freely. As such, the only reaction force applied to the body of the tool 100 is the motor 108 accelerating the hammer 112, and thus the operator feels very little torque or impacting forces, even though a very high peak torque is delivered. The impact mechanism 110 generally requires a predetermined amount of minimum torque to separate (or disengage) the hammer 112 from the anvil 114 after an impact. Under low resisting torque working conditions, the predetermined torque requirement allows the hammer 112 to stay engaged with and rotate together with the anvil 114, causing the tool 100 to stop hammering or impacting and instead smoothly drive and rapidly rotate the work piece.

Figure 2:
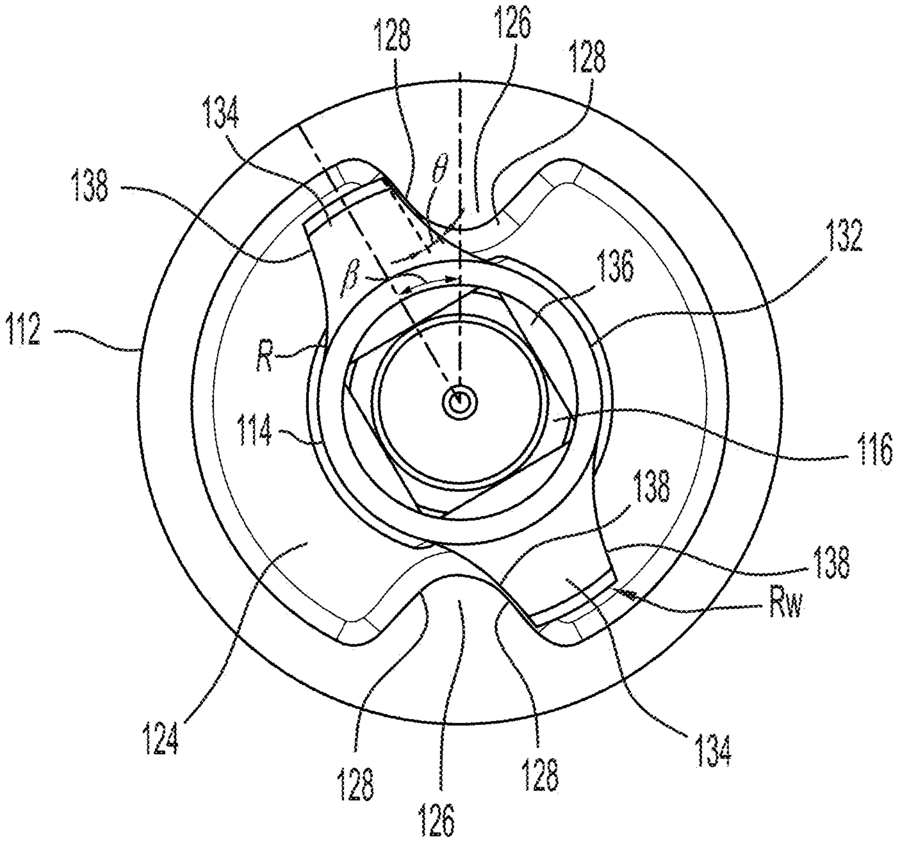
FIG. 2 is a perspective view of an impact mechanism, according to an embodiment of the invention.

Referring to FIGS. 1 and 2, in an embodiment, the hammer 112 of the impact mechanism 110 may include a hammer base 124 and one or more hammer lugs 126, and the hammer 112 is rotatable (via operation of the motor 108) about a central axis of the hammer 112. As illustrated, the hammer lugs 126 protrude from the hammer base 124 and protrude radially inwardly towards the central axis of the hammer 112. Each of the hammer lugs 126 defines hammer impact surfaces 128 that contact the anvil 114 (such as the anvil wings 134 on anvil impact surfaces 138 described below) during an impacting operation. The hammer 112 may include or be coupled to a drive shaft 130 axially aligned with the center of the hammer and receiving rotational force from the motor 108.

Figure 3A:
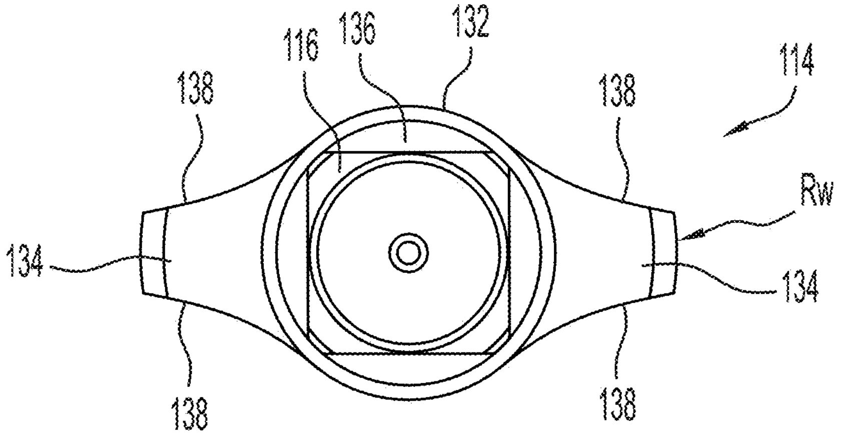
FIG. 3A is an end perspective view of an anvil of an impact mechanism, according to an embodiment of the invention.
Figure 3B:
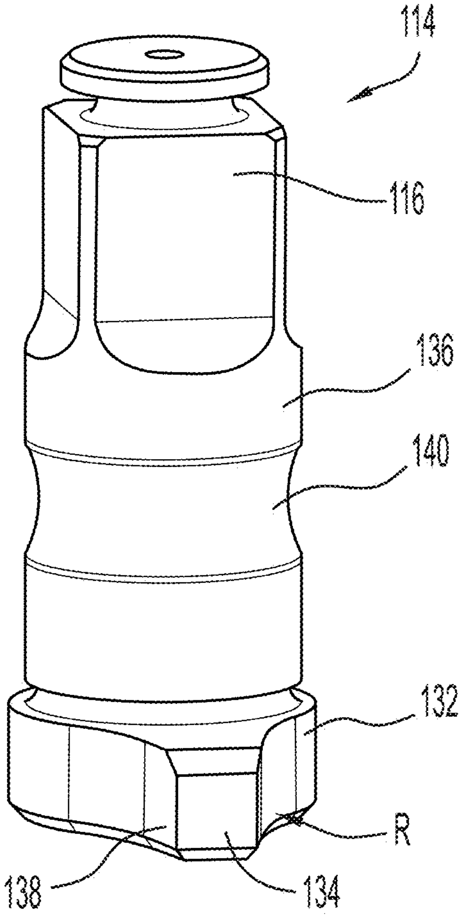
FIG. 3B is a side perspective view of the anvil of FIG. 3A.

Referring to FIGS. 2, 3A and 3B, in an embodiment, the anvil 114 of the impact mechanism 110 may include an anvil base 132, one or more anvil wings 134 extending radially outwardly from the base 132, an anvil shaft 136 extending axially from the anvil base 132, and the drive 116 proximal to an end of the anvil shaft 136. The anvil 114 is rotatable (via operation of the motor 108 and hammer 112) about a central axis of the anvil 114. Each of the anvil wings 134 defines anvil impact surfaces 138 that contact the respective hammer impact surfaces 128 during an impacting operation. Each of the anvil wings 134 may also be tapered at a taper angle (θ) of about 5 degrees to about 30 degrees, which also provides for the anvil impact surfaces 138 being tapered at the taper angle (θ). As illustrated in FIG. 3, the drive is a ¾ inch square drive lug, and the taper angle (θ) is about 15 degrees. The anvil 114 may also include an undercut or groove portion 140 extending circumferentially around the anvil shaft 136. The groove 140 has an outer diameter less than an outer diameter of the anvil shaft 136. For example, the outer diameter of the groove 140 may be about 25% to about 100% of an outer diameter of the anvil shaft 136, about 25% to about 75% of the outer diameter of the anvil shaft 136, and/or about 25% to about 50% of the outer diameter of the anvil shaft 136. The groove 140 may assist in reducing inertia (i.e. mass of the anvil 114) and add a spring effect on the anvil shaft 136, which assists in reducing stress at the transition from the anvil shaft 136 to the drive 116.

The highest stress on the anvil wing 134 occurs at the intersection of the anvil wings 134 and the anvil base 132. At this intersection, a dominant bending stress at the anvil wings 134 transitions to torsional stress in the anvil shaft 136. A larger anvil shaft 136 or base 132 can be added to connect the anvil wings 134 and the anvil shaft 136 to provide an intermediate transition, reducing eruption at the transition from bending stress to torsional stress. At the intersection of the anvil wings 134 and the anvil base 132 a radius (R) can be positioned to provide a smooth geometric transition from the anvil base 132 to the anvil wings 134. The radius (R) also increases a section modulus at the intersection of the anvil wings 134 and the anvil base 132, thus decreasing bending stresses. However, a larger radius can result in smaller wing contact areas or anvil impact surfaces 138. The anvil wings 134 can be extended to increase the contact area, but this can lower the output torque due to the higher anvil inertia from additional wing material. In an example, the radius (R) is about 100% to about 150% of a radius of the anvil base 132. A radius of the anvil wings 134 $R_W$ may also be about 100% to about 250%, and more particularly about 150% to about 200% of the radius of the anvil base 132.

The hammer 112 and anvil 114 also provide an angle (β) between a centerline of the hammer lug 126 and a centerline of the anvil wing 134. Minimizing an overlap angle (2β) provides additional clearance for the hammer 112 to rotate (hammer travel range=180°−overlap angle), lessening potential impact with a bottom surface of the anvil wings 134 during operation (also known as clipping). In an example, the angle (β) is about 20 degrees to about 40 degrees. This range provides an adequate cross-section of material in the anvil wing 134 and hammer lug 126 to endure the impact stress and allows a wide range of hammer rotation without clipping.

By tapering the anvil wings 134 at the taper angle (θ), the section modulus of the anvil 114 at the intersection of the anvil wings 134 and the anvil base 132 can be increased without increasing an entire cross-section of the anvil wings 134. Traditional straight wings with the same section modulus at the intersection results in significantly higher anvil inertia, due to the additional material at the wing tips, and thus lower output torque. Also, by tapering the anvil wings 134 at the taper angle (θ), the section modulus of the anvil at the critical location can be increased without sacrificing the hammer travel range.

Further, a resultant area $$\left(A_T = \frac{A}{\cos\theta}\right)$$

with the tapered anvil wings 134 provides a larger contact area between the hammer lug 126 and anvil wing 134, decreasing contact pressure. Contact area per anvil wing surface (e.g., anvil impact surfaces 138) may be about 0.01 to about 0.2 square inches, and more particularly, about 0.02 to about 0.1 square inches. A total system contact area during operation is twice the contact area per anvil wing surface when two anvil wings 134 (e.g., anvil impact surfaces 138) are contacted simultaneously by the hammer lugs 126 (e.g., at hammer impact surfaces 128). By varying the taper angle (θ), the gradually decreasing stiffness of the anvil wing 134 along the length can be accomplished to improve stress distribution and stress at the root of the hammer lugs 126. The taper angle (θ) of about 5 degrees to about 30 degrees provides the minimum overlap angle and improves stress distributions at the hammer lugs 126 and anvil wings 134.

Figure 4A:
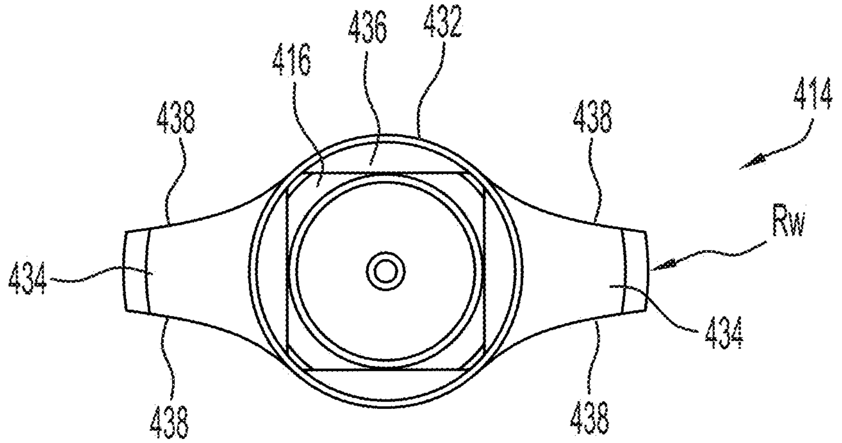
FIG. 4A is an end perspective view of an anvil of an impact mechanism, according to an embodiment of the invention.
Figure 4B:
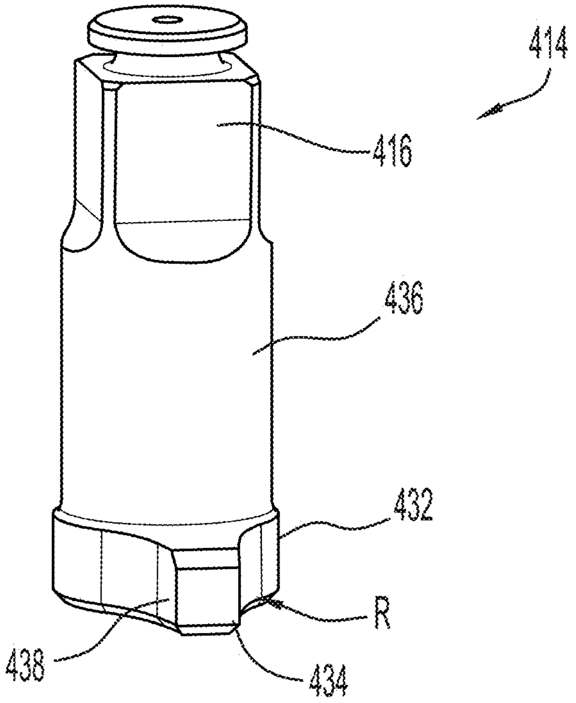
FIG. 4B is a side perspective view of the anvil of FIG. 4A.

Referring to FIGS. 4A and 4B, an embodiment of an anvil 414 is shown. The anvil 414 is similar to the anvil 114, and may include one or more of the features of the anvil 114. For example, the anvil 414 may include an anvil base 432, one or more anvil wings 434 extending radially outwardly from the base 432 with anvil impact surfaces 438, an anvil shaft 436 extending axially from the anvil base 432, and a drive 416 proximal to an end of the anvil shaft 436. The anvil 414 may also include an undercut or groove portion (not shown) extending circumferentially around the anvil shaft 436.

In this example, the drive 416 is a ¾ inch square drive lug, and each of the anvil wings 434 may also be tapered at a taper angle (θ) of about 5 degrees to about 30 degrees, and more particularly, about 10 degrees. The radius (R) may be about 0.7 to about 0.8 inches, and more particularly about 0.75 inches, the radius of the anvil wings $R_W$ may be about 1 inch, and the impact (contact) surface area may be about 0.06 to about 0.08 square inches, and more particularly about 0.07 square inches on each of the anvil impact surfaces 438.

Figure 5A:
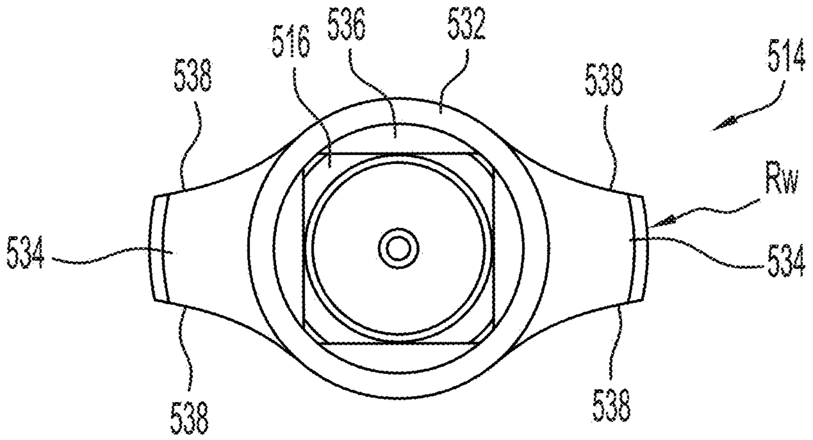
FIG. 5A is an end perspective view of an anvil of an impact mechanism, according to an embodiment of the invention.
Figure 5B:
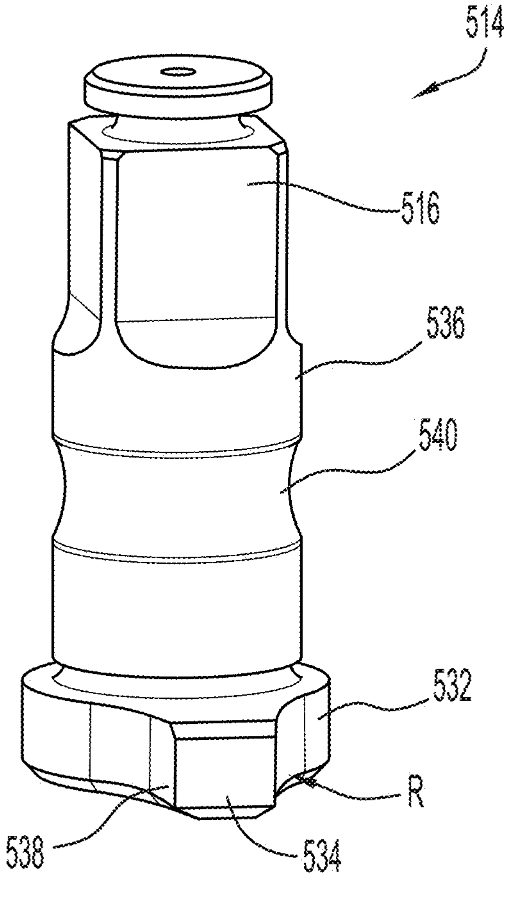
FIG. 5B is a side perspective view of the anvil of FIG. 5A.

Referring to FIGS. 5A and 5B, an anvil 514 is described. The anvil 514 is similar to the anvil 114, and may include one or more of the features of the anvil 114. For example, the anvil 514 may include an anvil base 532, one or more anvil wings 534 extending radially outwardly from the base 532 with anvil impact surfaces 538, an anvil shaft 536 extending axially from the anvil base 532, and a drive 516 proximal to an end of the anvil shaft 536. The anvil 514 may also include an undercut or groove portion 540 extending circumferentially around the anvil shaft 536.

In this example, the drive 516 is a ¾ inch square drive lug, and each of the anvil wings 534 may also be tapered at a taper angle (θ) of about 5 degrees to about 30 degrees, and more particularly, about 12 degrees. The radius (R) may be about 0.575 to about 0.65 inches, and more particularly about 0.625 inches, the radius of the anvil wings $R_W$ may be about 1 inch, and the impact (contact) surface area may be about 0.05 to about 0.07 square inches, and more particularly about 0.06 square inches on each of the anvil impact surfaces 538.

Figure 6A:
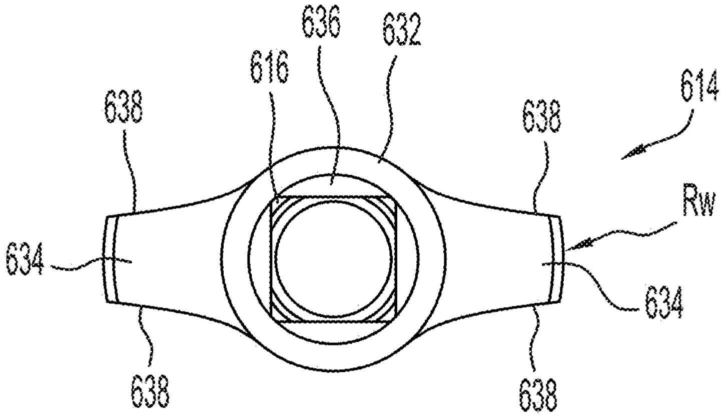
FIG. 6A is an end perspective view of an anvil of an impact mechanism, according to an embodiment of the invention.
Figure 6B:
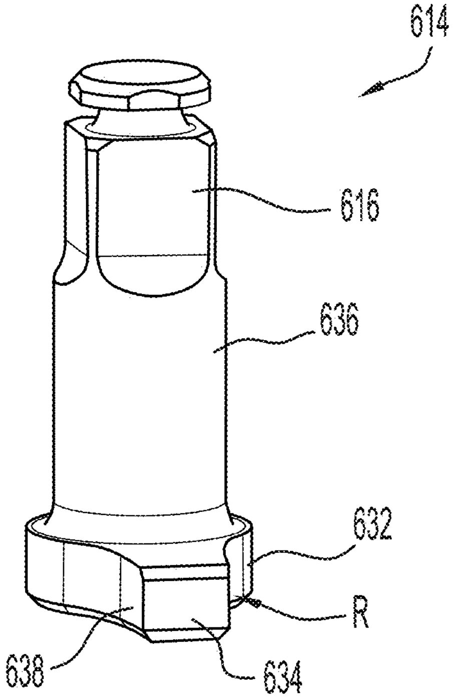
FIG. 6B is a side perspective view of the anvil of FIG. 6A.

Referring to FIGS. 6A and 6B, another embodiment of an anvil 614 is described. The anvil 614 is similar to the anvil 114, and may include one or more of the features of the anvil 114. For example, the anvil 614 may include an anvil base 632, one or more anvil wings 634 extending radially outwardly from the base 632 with anvil impact surfaces 638, an anvil shaft 636 extending axially from the anvil base 632, and a drive 616 proximal to an end of the anvil shaft 636. The anvil 614 may also include an undercut or groove portion (not shown) extending circumferentially around the anvil shaft 636.

In this example, the drive 616 is a ⅜ inch square drive lug, and each of the anvil wings 634 may also be tapered at a taper angle (θ) of about 5 degrees to about 30 degrees, and more particularly, about 7.5 degrees. The radius (R) may be about 0.5 to about 0.6 inches, and more particularly about 0.55 inches, the radius of the anvil wings $R_W$ may be about 0.6 to about 0.7 inches, and more particularly about 0.68 inches, and the impact (contact) surface area may be about 0.02 to about 0.04 square inches, and more particularly about 0.03 square inches on each of the anvil impact surfaces 638.

Figure 7A:
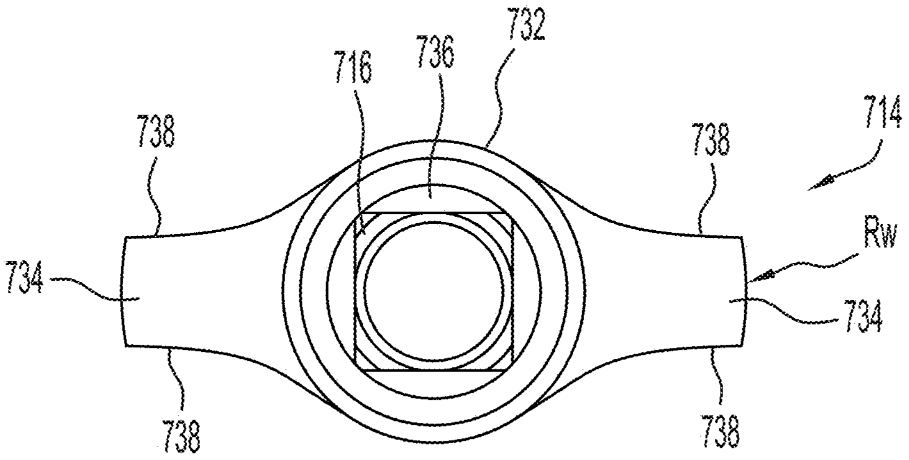
FIG. 7A is an end perspective view of an anvil of an impact mechanism, according to an embodiment of the invention.
Figure 7B:
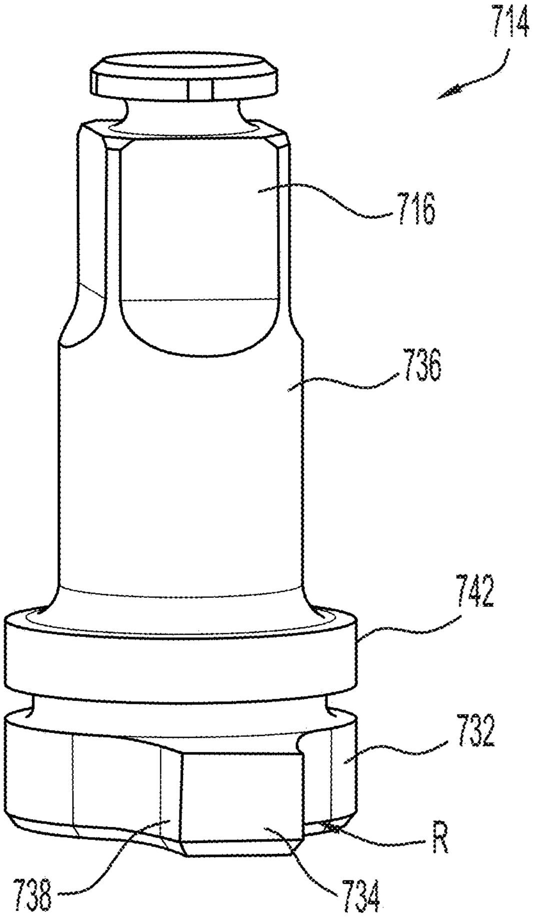
FIG. 7B is a side perspective view of the anvil of FIG. 7A.

Referring to FIGS. 7A and 7B, another embodiment of an anvil 714 is shown. The anvil 714 is similar to the anvil 114, and may include one or more of the features of the anvil 114. For example, the anvil 714 may include an anvil base 732, one or more anvil wings 734 extending radially outwardly from the base 732 with anvil impact surfaces 738, an anvil shaft 736 extending axially from the anvil base 732, and a drive 716 proximal to an end of the anvil shaft 736. The anvil 714 may also include an undercut or groove portion (not shown) extending circumferentially around the anvil shaft 736. The anvil 714 may include an added base portion 742 extending circumferentially around the anvil shaft 736, between the anvil shaft 736 and anvil wings 734. The added base portion 742 may assist in providing intermediate stress transformation from the anvil wings 734 to the anvil shaft 736. The added base portion 742 may also be incorporated into any of the other anvil designs described herein (such as anvils 114, 414, 514, 614, 814 and/or 914).

In this example, the drive 716 is a ½ inch square drive lug, and each of the anvil wings 734 may also be tapered at a taper angle (θ) of about 5 degrees to about 30 degrees, and more particularly, about 5 degrees. The radius (R) may be about 0.475 to about 0.6 inches, and more particularly about 0.525 inches, the radius of the anvil wings $R_W$ may be about 1 inch, and the impact (contact) surface area may be about 0.03 to about 0.05 square inches, and more particularly about 0.04 square inches on each of the anvil impact surfaces 738.

Figure 8A:
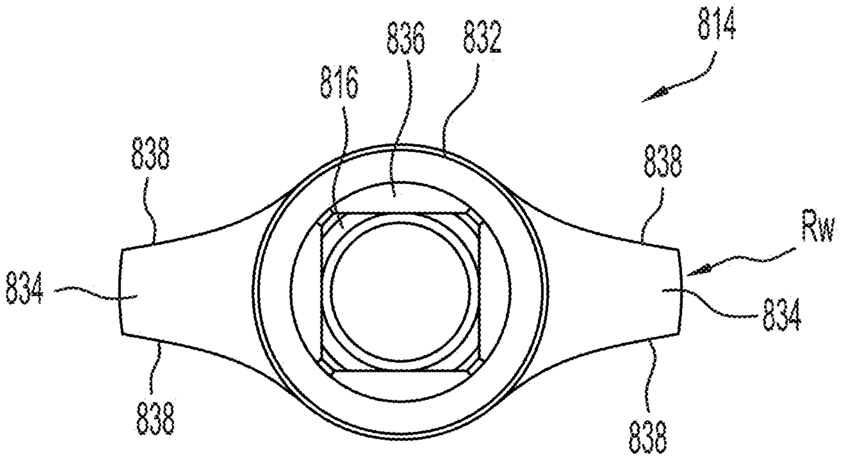
FIG. 8A is an end perspective view of an anvil of an impact mechanism, according to an embodiment of the invention.
Figure 8B:
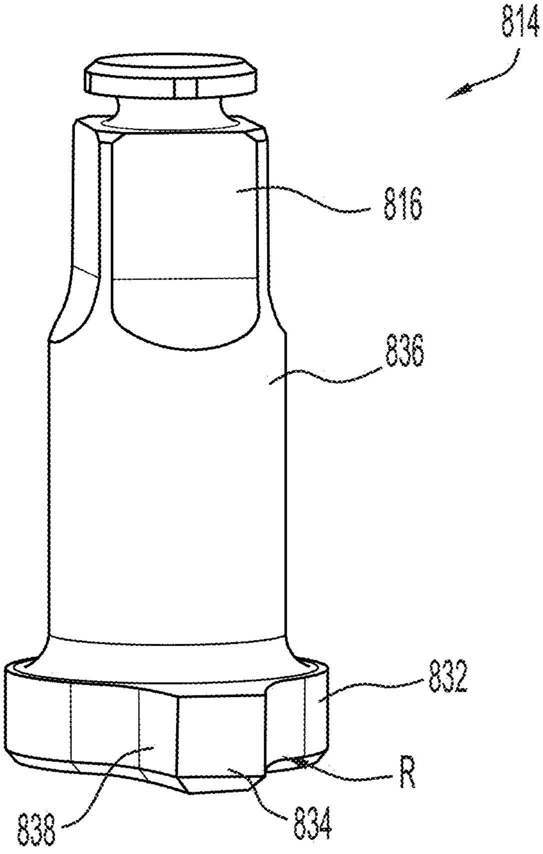
FIG. 8B is a side perspective view of the anvil of FIG. 8A.

Referring to FIGS. 8A and 8B, another embodiment of an anvil 814 is shown. The anvil 814 is similar to the anvil 114, and may include one or more of the features of the anvil 114. For example, the anvil 814 may include an anvil base 832, one or more anvil wings 834 extending radially outwardly from the base 832 with anvil impact surfaces 838, an anvil shaft 836 extending axially from the anvil base 832, and a drive 816 proximal to an end of the anvil shaft 836. The anvil 814 may also include an undercut or groove portion (not shown) extending circumferentially around the anvil shaft 836. The anvil 814 may include an added base portion (not shown), such as the added base portion 742 extending circumferentially around the anvil shaft 836.

In this example, the drive 816 is a ½ inch square drive lug, and each of the anvil wings 834 may also be tapered at a taper angle (θ) of about 5 degrees to about 30 degrees, and more particularly, about 12.5 degrees. The radius (R) may be about 0.5 to about 0.7 inches, and more particularly about 0.6 inches, the radius of the anvil wings $R_W$ may be about 1 inch, and the impact (contact) surface area may be about 0.05 to about 0.07 square inches, and more particularly about 0.06 square inches on each of the anvil impact surfaces 838.

Figure 9A:
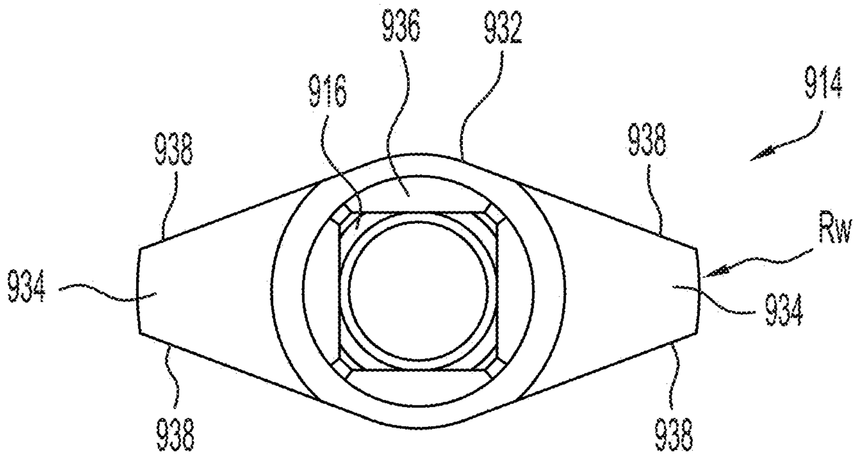
FIG. 9A is an end perspective view of an anvil of an impact mechanism, according to an embodiment of the invention.
Figure 9B:
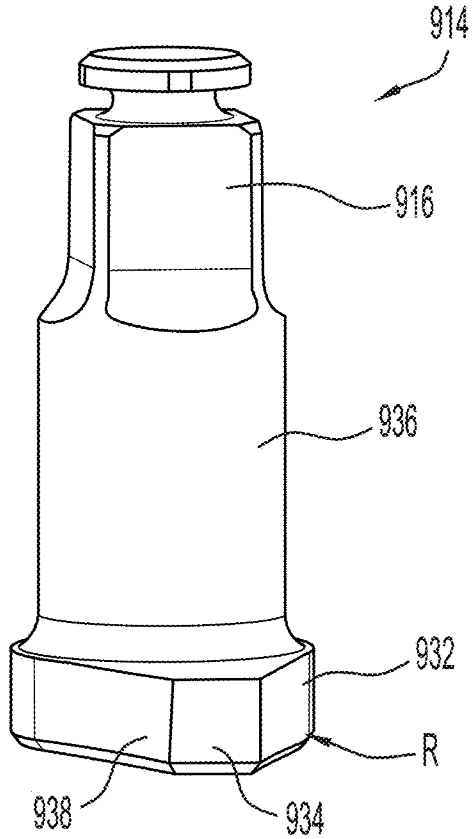
FIG. 9B is a side perspective view of the anvil of FIG. 9A.

Referring to FIGS. 9A and 9B, another embodiment of an anvil 914 is shown. The anvil 914 is similar to the anvil 114, and may include one or more of the features of the anvil 114. For example, the anvil 914 may include an anvil base 932, one or more anvil wings 934 extending radially outwardly from the base 932 with anvil impact surfaces 938, an anvil shaft 936 extending axially from the anvil base 932, and a drive 916 proximal to an end of the anvil shaft 936. The anvil 914 may also include an undercut or groove portion (not shown) extending circumferentially around the anvil shaft 936. The anvil 914 may include an added base portion (not shown), such as the added base portion 742 extending circumferentially around the anvil shaft 936.

In this example, the drive 916 is a ½ inch square drive lug, and each of the anvil wings 934 may also be tapered at a taper angle (θ) of about 5 degrees to about 30 degrees, and more particularly, about 21 degrees. The radius (R) may be infinite, the radius of the anvil wings $R_W$ may be about 1 inch, and the impact (contact) surface area may be about 0.03 to about 0.05 square inches, and more particularly about 0.04 square inches on each of the anvil impact surfaces 938.

As described herein, the anvil includes anvil wings that taper at a taper angle of about 5 degrees to about 30 degrees. The taper angle assists in increasing a section modulus of the anvil at the intersection of the wings and the shaft without increasing the entire cross-section of the wings, and without sacrificing the hammer travel range. The taper angle also provides for a larger contact area between the lug of the hammer and wing of the anvil, decreasing contact pressure, and the decreasing stiffness of the wing along a length of the wing (due to the taper angle) improves stress distribution and stress at the lug of the hammer.

As used herein, the term "coupled" can mean any physical, electrical, magnetic, or other connection, either direct or indirect, between two or more components or parts. The term "coupled" is not limited to a fixed direct coupling between components or parts.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An impact mechanism for an impact tool, the impact mechanism comprising:
- an anvil including:
  - an anvil base portion;
  - a wing extending radially outwardly from the anvil base portion and tapering at a taper angle of about 5 degrees to about 30 degrees as the wing extends outwardly from the base portion; and
  - a shaft extending axially from the anvil base portion; and
- a hammer including:
  - a hammer base portion; and
  - a hammer lug protruding from the hammer base portion, and adapted to impact the wing at a contact area of the wing, wherein an angle between a centerline of the hammer lug and a centerline of the wing is about 20 degrees to about 40 degrees.

2. The impact mechanism of claim 1, wherein the anvil further includes a drive proximal to an end of the shaft.

3. The impact mechanism of claim 2, wherein the drive has a square cross-sectional shape.

4. The impact mechanism of claim 1, wherein the anvil further includes a groove portion extending circumferentially around the shaft.

5. The impact mechanism of claim 4, wherein the groove portion has a groove outer diameter and the shaft has a shaft outer diameter, wherein the groove outer diameter is about 25% to about 75% of the shaft outer diameter.

6. The impact mechanism of claim 5, wherein the groove outer diameter is about 25% to about 50% of the shaft outer diameter.

7. The impact mechanism of claim 1, wherein the contact area is about 6.45 to about 130 $mm^2$ (about 0.01 to about 0.2 square inches).

8. An anvil for an impact mechanism of an impact tool, the anvil comprising:

a base portion;

a wing extending radially outwardly from the base portion and having a width that tapers at a taper angle of about 5 degrees to about 30 degrees as the wing extends outwardly from the base portion;

a shaft extending axially from the base portion and having a shaft outer diameter;

a drive proximal to an end of the shaft; and a groove portion extending circumferentially around the shaft and disposed between the drive and the wing, wherein the groove portion has a groove outer diameter that is about 25% to about 75% of the shaft outer diameter.

9. The anvil of claim 8, wherein the drive has a square cross-sectional shape.

10. The anvil of claim 8, wherein the taper angle is about 15 degrees.

11. The anvil of claim 8, wherein the groove outer diameter is about 25% to about 50% of the shaft outer diameter.

12. The anvil of claim 8, wherein the wing includes a contact area of about 6.45 to about 130 $mm^2$ (about 0.01 to about 0.2 square inches) that is adapted to contact a hammer lug.

* * * * *